United States Patent
Woo

(10) Patent No.: US 7,770,923 B2
(45) Date of Patent: Aug. 10, 2010

(54) STRUCTURE OF INFLATER INSIDE CYLINDER FOR AIR BAG FOR VEHICLE

(75) Inventor: Hee Sok Woo, Seongnam-si (KR)

(73) Assignee: Dae Ah Tech Co., Ltd., Cheonan (KR)

( * ) Notice: Subject to any disclaimer, the term of this patent is extended or adjusted under 35 U.S.C. 154(b) by 284 days.

(21) Appl. No.: 11/916,950

(22) PCT Filed: Jul. 31, 2006

(86) PCT No.: PCT/KR2006/002991

§ 371 (c)(1),
(2), (4) Date: Dec. 7, 2007

(87) PCT Pub. No.: WO2007/018358

PCT Pub. Date: Feb. 15, 2007

(65) Prior Publication Data

US 2008/0272581 A1    Nov. 6, 2008

(30) Foreign Application Priority Data

Aug. 10, 2005  (KR) .................. 10-2005-0073082
Jul. 14, 2006  (KR) .................. 10-2006-0066414

(51) Int. Cl.
*B60R 21/26* (2006.01)
(52) U.S. Cl. .................. 280/741; 280/736; 280/742
(58) Field of Classification Search .................. 280/736, 280/740, 741, 742
See application file for complete search history.

(56) References Cited

U.S. PATENT DOCUMENTS

| | | | |
|---|---|---|---|
| 4,950,458 A | | 8/1990 | Cunningham |
| 5,478,109 A | * | 12/1995 | Faigle et al. ................ 280/736 |
| 5,562,304 A | * | 10/1996 | Gest ........................... 280/740 |
| 5,564,741 A | * | 10/1996 | Ward et al. .................. 280/740 |
| 5,573,271 A | * | 11/1996 | Headley ...................... 280/741 |
| 5,753,852 A | | 5/1998 | Bernau et al. |
| 6,543,805 B2 | * | 4/2003 | McFarland et al. .......... 280/736 |
| 6,942,249 B2 | * | 9/2005 | Iwai et al. ................... 280/741 |
| 2003/0168841 A1 | | 9/2003 | Goto et al. |
| 2004/0100079 A1 | * | 5/2004 | Yamazaki et al. ........... 280/741 |
| 2004/0207188 A1 | * | 10/2004 | Matsuda et al. ............. 280/741 |
| 2007/0024038 A1 | * | 2/2007 | Numoto et al. ............. 280/736 |

* cited by examiner

*Primary Examiner*—Paul N. Dickson
*Assistant Examiner*—George D. Spisich
(74) *Attorney, Agent, or Firm*—John K. Park; Park Law Firm

(57) ABSTRACT

Disclosed herein is a structure of an inflater inside cylinder for an air bag for a vehicle, which lengthens the discharge course for gas generated from the inflater inside cylinder, thus preventing injury or damage due to high-temperature and high-pressure gas, and which is convenient to manufacture, is light, and has a low manufacturing cost thereof. According to the present invention, the air bag includes an outside cylinder and an inside cylinder, each having in a circumferential surface thereof a plurality of holes. In this case, the inside cylinder includes at least two cylindrical embossed steel plates, the plurality of holes being formed in embossed parts of the cylindrical embossed steel plates, which protrude outward or inwards from circumferential surfaces of the embossed steel plates so as to extend a gas discharge course. A mesh net is provided between the at least two cylindrical embossed steel plates.

8 Claims, 5 Drawing Sheets

[Fig. 1]
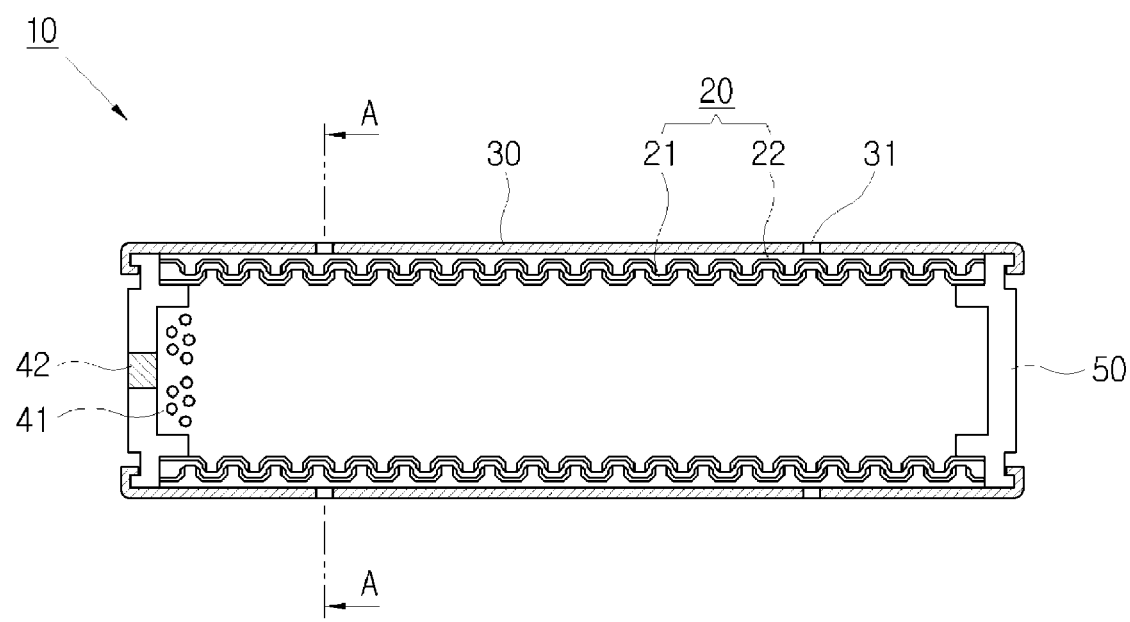
[Fig. 2]
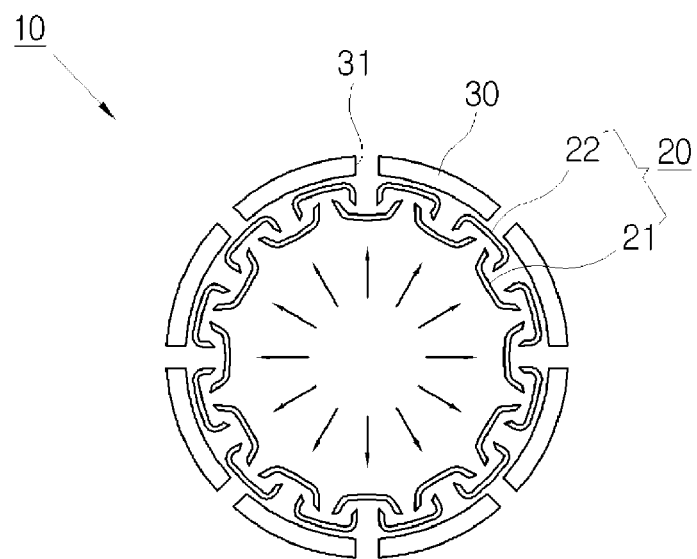

[Fig. 3]
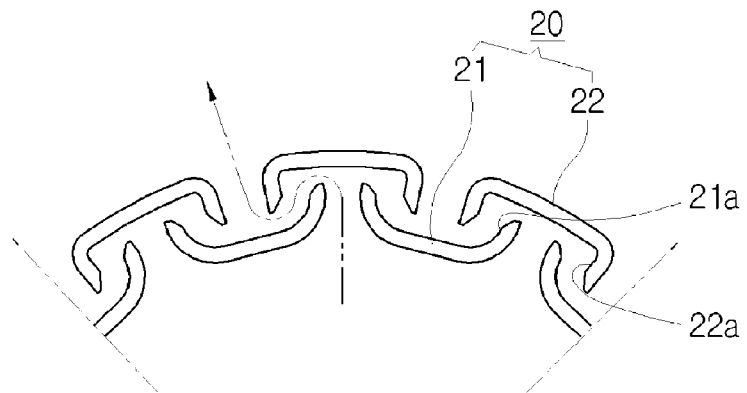
[Fig. 4]
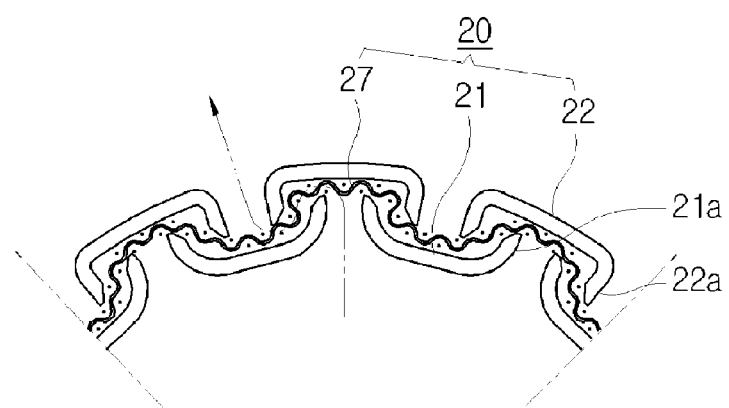
[Fig. 5]
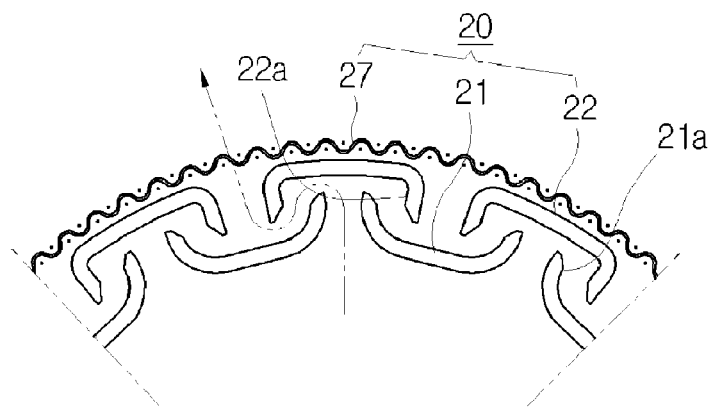

[Fig. 6]
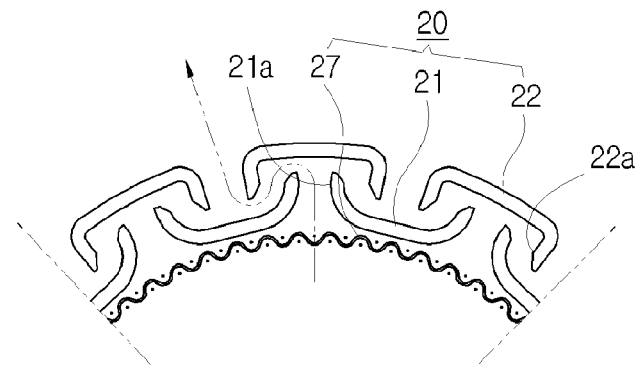
[Fig. 7]
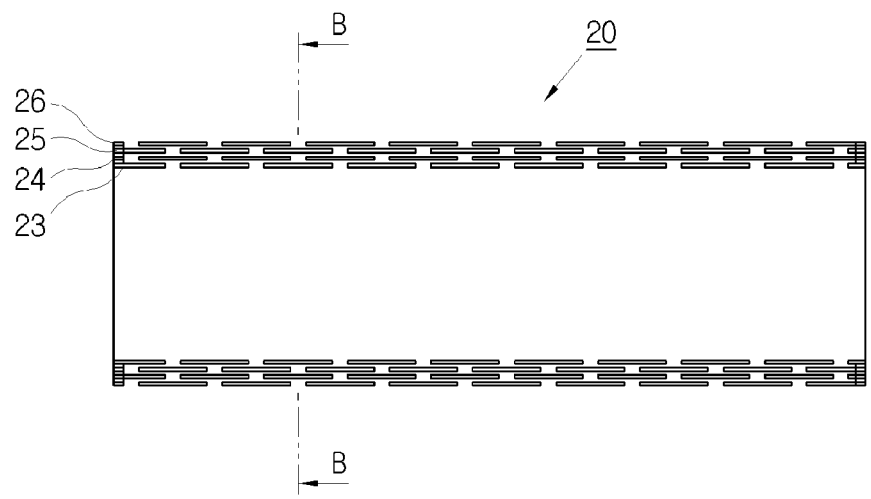
[Fig. 8]
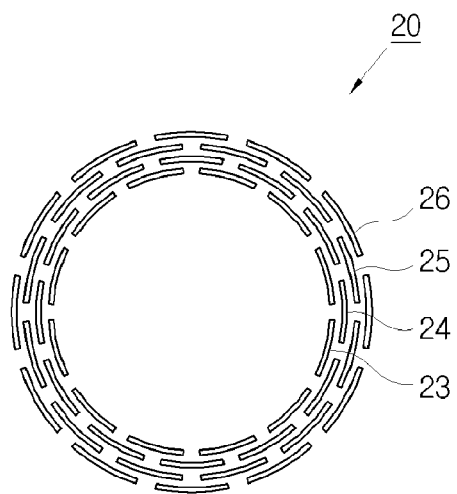

[Fig. 9]
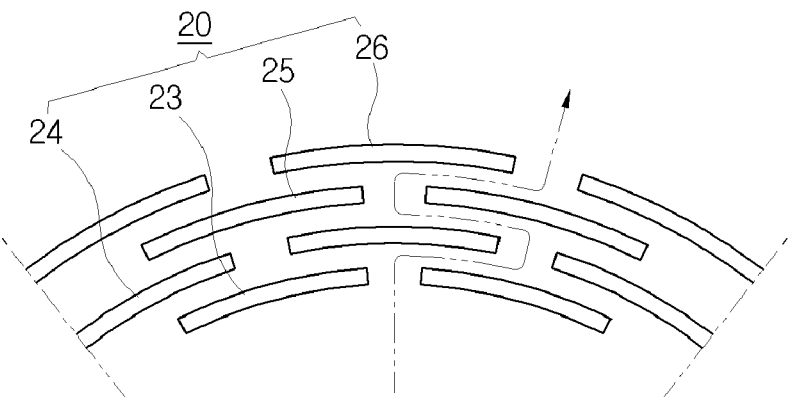
[Fig. 10]
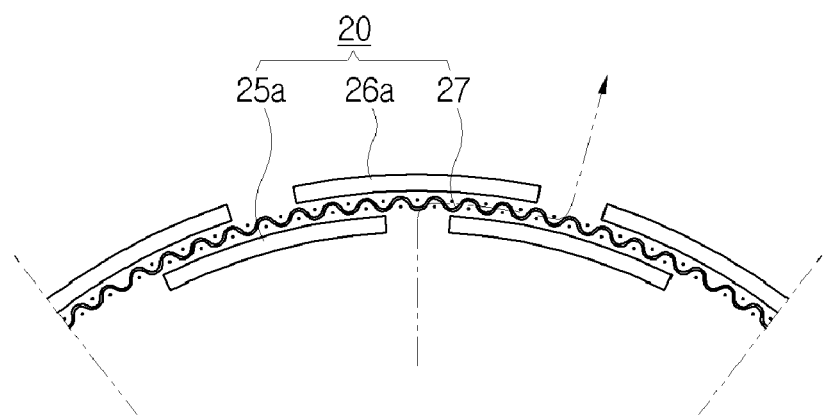
[Fig. 11]
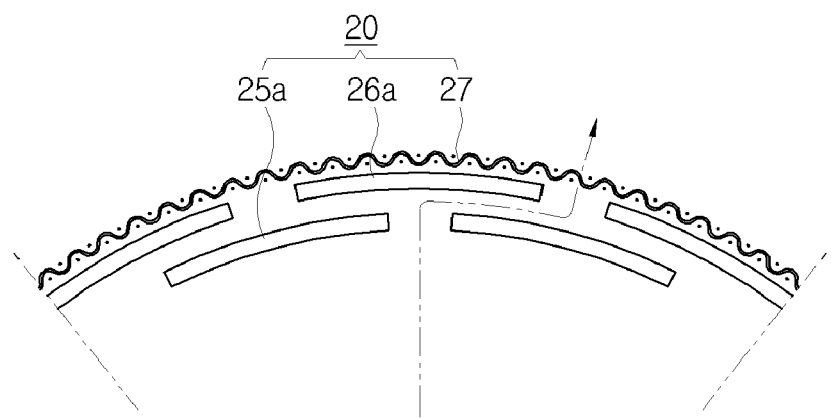

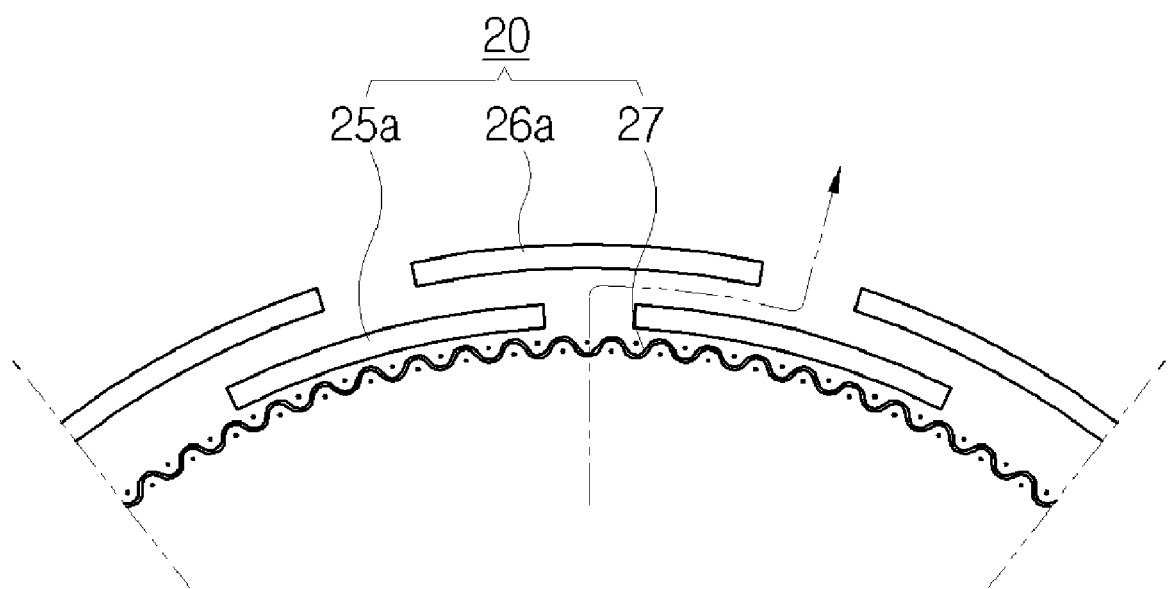
[Fig. 12]

STRUCTURE OF INFLATER INSIDE CYLINDER FOR AIR BAG FOR VEHICLE

TECHNICAL FIELD

The present invention relates, in general, to a structure of an inflater inside cylinder for an air bag for a vehicle and, more particularly, to a structure of an inflater inside cylinder for an air bag for a vehicle, in which the inflater inside cylinder has two or more overlapping layers, and holes of the layers of the inside cylinder are alternately arranged, thus extending the discharge course of high-temperature and high-pressure gas, generated when a gas generating material contained in the inflater is ignited, therefore preventing injury or damage due to the emission of the high-temperature and high-pressure gas.

BACKGROUND ART

Generally, an air bag is mounted to a steering wheel or an instrument panel of a vehicle so as to protect a driver or passenger in the event of a collision. When a collision between vehicles occurs, the air bag is inflated so that the passenger does not collide with the panel inside a vehicle or with a windshield, thus reducing the severity of injuries.

Such an air bag includes a cover, an inflater, an air bag module, an impact sensor, and an electronic control module. The cover is mounted to the instrument panel or the steering wheel in such a way that the expanding part of the cover faces a passenger. The operation of the inflater is controlled according to an input operation control signal, so that the inflater generates gas in a collision. The air bag module comprises an air bag cushion which is expanded using the gas generated by the inflater. The impact sensor generates an impact signal when the driving speed is suddenly lowered and the acceleration of gravity reaches a preset value. The electronic control module transmits an electric signal to an igniter, which ignites a gas generating material contained in the inflater in response to the impact signal.

The air bag constructed as described above is operated as follows. That is, when a vehicle is in a collision, impacts are transmitted through a vehicle body, and are detected by the impact sensor, thus determining whether to operate the air bag. When the impacts exceed a preset value, an electric signal is transmitted from the electronic control module to the igniter provided in the inflater, so that the gas generating material is ignited. As such, the gas generated when the gas generating material is ignited is jetted through the inside cylinder and an outside cylinder, so that the air bag cushion is expanded and inflated. The air bag cushion opens the cover, and contacts the body of the driver or passenger. After the air bag cushion contacts the body, the passenger gently rebounds and is returned to his or her original position. At this time, the air bag cushion slowly deflates.

The inflater includes the gas generating material, the inside cylinder, and the outside cylinder. The gas generating material generates gas when the gas generating material is ignited. The inside cylinder has a predetermined space to accommodate the gas generating material and the igniter for igniting the gas generating material in response to an external impact signal, with a plurality of holes formed in the circumference of the inside cylinder. The outside cylinder surrounds the inside cylinder, and has in the circumference thereof a plurality of holes to transmit the gas generated in the inside cylinder to the expanding part, that is, the air bag cushion. The inside cylinder of the inflater is made of wire nets folded several times in order to bear the high temperature and the high pressure of the gas generated due to the ignition of the gas generating material contained in the inflater, in addition to transmitting the gas to the outside cylinder.

DISCLOSURE OF INVENTION

Technical Problem

A conventional inflater of an air bag for a vehicle is constructed so that the inside cylinder of the inflater comprises wire nets folded several times. However, a discharge course for gas generated while the gas generating material contained in the inside cylinder is ignited and burnt is short, so that high-pressure and high-temperature gas is transmitted to an air bag cushion without a sufficient reduction in pressure and temperature of the gas. Thus, the conventional inflater has a problem in that a driver or passenger may suffer a burn or be bruised by the high temperature and high pressure transmitted to the air bag cushion. The conventional inflater has another problem in that the air bag cushion is torn and damaged due to the high-temperature and high-pressure gas.

Further, the conventional inflater inside cylinder comprising wire nets folded several times is constructed so that the wire nets are layered in several folds while net holes of the wire nets are arranged in a zigzag fashion. Thus, many workers are required, and such labor is very expensive. Further, the inflater inside cylinder is constructed to have several folds, so that it is heavy in weight, is large in volume, and is expensive in cost.

Technical Solution

Accordingly, the present invention has been made keeping in mind the above problems occurring in the prior art, and an object of the present invention is to provide a structure of an inflater inside cylinder for an air bag for a vehicle, which lengthens the discharge course for gas generated from the inflater inside cylinder, thus preventing injury or damage due to high-temperature and high-pressure gas, and which is convenient to manufacture, is light, and has a low manufacturing cost thereof.

Advantageous Effects

As described above, the present invention provides a structure of an inflater inside cylinder for an air bag for a vehicle, in which the circumferential surface of the inflater inside cylinder comprises steel plates having embossed holes, and at least two steel plates are layered such that the embossed holes thereof face each other, or steel plates having holes are layered on the circumferential surface of the inflater inside cylinder in such a way that the holes alternate with each other, thus sufficiently lengthening the discharge course for generated gas. Thereby, the temperature and the pressure of high-temperature and high-pressure gas generated due to the ignition of a gas generating material are sufficiently lowered so as not to affect an air bag cushion, thus preventing a driver or passenger from suffering trauma or a burn.

Further, an inflater inside cylinder for an air bag for a vehicle, according to the present invention, comprises two or more steel plates, and a mesh net is additionally mounted between the steel plates, the inner circumferential surface of the innermost steel plate, or the outer circumferential surface of the outermost steel plate, thus increasing the surface area. Thereby, the heat of gas can be more efficiently absorbed, and a sudden increase in pressure is delayed, so that safety is ensured, the performance of the inflater is improved, it is convenient to manufacture, and the manufacturing cost is low, in addition to reducing weight and volume.

BRIEF DESCRIPTION OF THE DRAWINGS

FIG. 1 is a sectional view showing an inflater of an air bag for a vehicle having an inside cylinder, according to the present invention;

FIG. 2 is a sectional view taken along line A-A of FIG. 1;

FIG. 3 is a detailed sectional view showing part of the inflater inside cylinder of FIG. 2;

FIGS. 4 to 6 are sectional views showing other embodiments of an inflater inside cylinder for an air bag for a vehicle, according to the present invention;

FIG. 7 is a sectional view showing a structure of an inflater inside cylinder for an air bag for a vehicle, according to a further embodiment of the present invention;

FIG. 8 is a sectional view taken along line B-B of FIG. 7;

FIG. 9 is a detailed sectional view showing part of the inflater inside cylinder of FIG. 8; and FIGS. 10 to 12 are sectional views showing other embodiments of an inflater inside cylinder for an air bag for a vehicle, according to the present invention.

BEST MODE FOR CARRYING OUT THE INVENTION

In order to accomplish the object, the present invention provides a structure of an inflater inside cylinder for an air bag for a vehicle, the air bag including an outside cylinder and an inside cylinder, each having in a circumferential surface thereof a plurality of holes, wherein the inside cylinder includes at least two cylindrical embossed steel plates, the plurality of holes being formed in embossed parts of the cylindrical embossed steel plates, which protrude outward or inwards from circumferential surfaces of the embossed steel plates so as to extend a gas discharge course.

The embossed holes are formed in one surface of each of the cylindrical embossed steel plates such that the embossed holes protruding from one of the cylindrical embossed steel plates face and alternate with the embossed holes protruding from the other cylindrical embossed steel plate. Thus, the thickness of the inflater inside cylinder can be reduced by the extent of overlap of the embossed holes.

Further, the present invention provides a structure of an inflater inside cylinder for an air bag for a vehicle, the air bag including an outside cylinder and an inside cylinder, each having in a circumferential surface thereof a plurality of holes, wherein the inside cylinder comprises at least two cylindrical perforated steel plates, the cylindrical perforated steel plates being layered such that holes formed in circumferential surfaces thereof alternate with each other and are spaced apart from each other by a predetermined interval, thus extending a gas discharge course.

Further, the inside cylinder of the air bag for the vehicle according to the present invention comprises two or more cylindrical embossed steel plates or two or more cylindrical perforated steel plates, with a mesh net installed between the steel plates. The mesh net comprises a metal mesh net, such as a lattice wire net, a metal lath, or a wire lath, or comprises a non-metal mesh net made of heat-resistant ceramic fiber.

Further, the mesh net may be provided on the inner circumferential surface or the outer circumferential surface of the inside cylinder. In a detailed description, when the inside cylinder comprises two or more cylindrical embossed steel plates or cylindrical perforated steel plates, the mesh net may be provided on the inner circumferential surface of an innermost steel plate or the outer circumferential surface of an outermost steel plate.

MODE FOR THE INVENTION

Hereinafter, the preferred embodiments of the present invention will be described in detail with reference to the accompanying drawings.

FIGS. 1 and 2 are sectional views schematically showing an inflater of an air bag for a vehicle, according to the present invention, and FIG. 3 is a detailed sectional view showing part of an inflater inside cylinder of FIG. 2.

As shown in the drawings, an inflater 10 for an air bag for a vehicle, according to the present invention, includes an inside cylinder 20, an outside cylinder 30, a gas generating material 41, an igniter 42, and sealing parts 50. The outside cylinder 30 is provided outside the inside cylinder 20, is spaced apart from the inside cylinder 20, and covers the inside cylinder 20. The gas generating material 41 in the form of a pellet is contained in the inside cylinder 20, and generates high-temperature and high-pressure gas. The igniter 42 ignites the gas generating material 41, in response to an impact signal detected from an impact sensor (not shown), when an accident, such as a collision between vehicles, occurs. The sealing parts 50 firmly seal the two ends of the outside cylinder 30 as well as the inside cylinder 20, in addition to ensuring air-tightness.

Referring to the drawing, the igniter 42 is provided on one of the sealing parts 50 which are provided on both ends of the inside cylinder 20. However, the igniter may be provided in the center of the inside cylinder 20, or may be embedded in the gas generating material 41 which is provided in the inside cylinder 20.

A plurality of gas exhaust ports 31 is formed in the outer and lower ends of the outer circumference of the outside cylinder 30 so as to supply high-temperature and high-pressure gas, which is generated due to the ignition of the gas generating material 41 contained in the inside cylinder 20, to an air bag cushion.

The inside cylinder 20 comprises two or more embossed steel plates, that is, first and second embossed steel plates 21 and 22, through which a plurality of holes is bored so that high-temperature and high-pressure gas, generated due to the ignition of the gas generating material 41 contained in the inside cylinder 20, is discharged to the outside cylinder 30.

In order to lengthen the discharge course for gas generated due to the ignition of the gas generating material 41, the holes of the first and second embossed steel plates 21 and 22 are bored in embossed parts 21a and 22a which protrude outwards or inwards from the surfaces of the first and second embossed steel plates 21 and 22. That is, the holes are formed as embossed holes. In this case, the embossed holes are formed in such a manner that a material around each of the holes, which has a thickness being almost equal to that of the remaining portions of the first or second embossed steel plate 21 or 22, is protruded.

Further, the outward protruding embossed holes are formed in the first embossed steel plate 21 which defines the inside portion of the inside cylinder 20. The inward protruding embossed holes are formed in the second embossed steel plate 22 which defines the outside portion of the inside cylinder 20. The first and second embossed steel plates are arranged such that the embossed holes thereof face and alternate with each other. The reason why the embossed holes face and alternate with each other is because the thickness of the inside cylinder can be reduced by the extent of overlap of the protruding embossed holes, and the discharge course can be lengthened.

In order to reliably ensure the gas discharge course when the first and second embossed steel plates 21 and 22 are assembled with each other, the embossed holes of the first and second embossed steel plates 21 and 22 must be manufactured to have a predetermined diameter, so that the embossed holes are spaced apart from each other by a predetermined interval without contacting each other, thus defining gaps.

In the inflater inside cylinder constructed as described above, high-temperature and high-pressure gas, generated while the gas generating material 41 is ignited and burnt, is discharged through the embossed holes of the first embossed steel plate 21, until the gas reaches the second embossed steel plate 22 arranged outside the first embossed steel plate 21. Thereafter, the gas is turned and rotated, thus being discharged through the embossed holes of the second embossed steel plate 22.

As such, the inside cylinder is provided with two or more embossed steel plates, so that the discharge course for the high-temperature and high-pressure gas, which is formed by the ignition of the gas generating material 41 and is discharged to the outside cylinder 30, is lengthened. When the gas discharge course is lengthened as such, the heat of the gas is absorbed, and a sudden increase in pressure is delayed, so that the temperature and the pressure of the gas are lowered.

Merely by fitting the first and second embossed steel plates 21 and 22 into each other to assemble the inflater inside cylinder, the embossed holes of the first and second embossed steel plates 21 and 22 face and alternate each other, and the first and second embossed steel plates 21 and 22 maintain a predetermined interval. Thereby, it is advantageous in that the assembly is simple. Of course, the embossed holes form space between the first and second embossed steel plates 21 and 22, thus remarkably reducing weight.

FIG. 4 is a sectional view showing an inflater inside cylinder, according to another embodiment of the present invention. According to this embodiment, a perforated plate having fine perforations or a mesh net 27 is additionally installed between the first and second embossed steel plates 21 and 22. The perforated plate or mesh net 27 may be provided on the outer circumferential surface of the second embossed steel plate 22, as shown in FIG. 5, or may be provided on the inner circumferential surface of the first embossed steel plate 21, as shown in FIG. 6.

The mesh net 27 may comprise a lattice steel net obtained by shaping wire into the form of a lattice, a wire lath obtained by weaving wire in the pattern of a diamond, or a metal lath obtained by forming slits on a thin steel plate having the thickness of 0.5 to 0.8 mm at regular intervals and extending it sideways, thus causing the slits to form a diamond pattern.

Preferably, the perforated plate or mesh net 27 is 50 to 200 mesh in order to smoothly discharge gas. In a detailed description, when the perforate plate or mesh net is less than 50 mesh, the passage of gas is too fast, and thus there is no effect of delaying the gas flow. Conversely, when the perforated plate or mesh net is more than 200 mesh, the passage of gas is too slow, and thus the expansion of the air bag cushion is delayed. Thereby, the inflater cannot efficiently perform its function.

The inflater inside cylinder constructed as described above has the following effect. That is, the gas, which is generated while the gas generating material 41 contained in the inside cylinder 20 is ignited and burnt, has high pressure and a high temperature of 2000° C. or higher. When the gas is discharged from the inside cylinder 20 to the outside cylinder 30, the first and second embossed steel plates 21 and 22 and the mesh net 27 extend the gas discharge course and increase the surface area. Thereby, the heat of the gas is efficiently absorbed and a sudden increase in pressure is delayed, so that safety is ensured and the performance of the inflater is improved.

In this case, the inflater inside cylinder has a two-layered structure having the first and second embossed steel plates 21 and 22. However, the inflater inside cylinder may have three or more embossed steel plates, as necessary.

FIGS. 7 and 8 are sectional views showing an inflater inside cylinder for an air bag for a vehicle, according to a further embodiment of the present invention, and FIG. 9 is a detailed sectional view showing part of the inflater inside cylinder of FIG. 8.

According to this embodiment, an inside cylinder 20 of an inflater 10 comprises first to fourth perforated steel plates 23, 24, 25, and 26 which are layered in four folds and define the circumference of the inside cylinder. A plurality of holes is regularly bored in upper, lower, left, and right sides (i.e. four sides) of the first to fourth perforated steel plates 23, 24, 25, and 26, so as to lengthen the discharge course of the gas, which is generated due to the ignition of a gas generating material 41. In this case, the perforated steel plates 23, 24, 25, and 26 are spaced apart from each other at regular intervals and are layered such that the holes of the perforated steel plates alternate with each other.

According to this embodiment, the inside cylinder 20 comprises the four perforated steel plates, that is, the first to fourth perforated steel plates 23, 24, 25, and 26. However, the inside cylinder may comprise two or more perforated steel plates.

According to this embodiment, the first to fourth perforated steel plates 23, 24, 25, and 26 are layered such that the holes of the steel plates alternate with each other. Thus, high-temperature and high-pressure gas contained in the inside cylinder 20 is discharged to the holes of the first perforated steel plate 23, which is the innermost steel plate of the inside cylinder, and reaches the second perforated steel plate 24 which is located just outside the first perforated steel plate. Thereby, the gas is turned to the left or right and is changed in direction, thus being discharged through the holes of the second perforated steel plate 24. The discharged gas reaches the third perforated steel plate 25, is turned to the left or right and is changed in direction, thus being discharged through the holes of the third perforated steel plate 25. Further, the discharged gas reaches the fourth perforated steel plate 26, is turned to the left or right and is changed in direction in a zigzag fashion. Thereby, the gas is discharged through the holes of the fourth perforated steel plate 26.

As such, when the inside cylinder of the inflater is provided with the first to fourth perforated steel plates 23 to 26, the course for discharging the high-temperature and high-pressure gas, generated due to the ignition of the gas generating material 41, from the inside cylinder to the outside cylinder is lengthened. The long gas discharge course efficiently absorbs the heat of the gas, and delays a sudden increase in pressure, thus lowering the temperature and pressure of the gas.

FIG. 10 is a sectional view showing an inflater inside cylinder for an air bag for a vehicle, according to a further embodiment of the present invention. According to this embodiment, a mesh net 27 is installed between two perforated steel plates 25a and 26a. The mesh net 27 may be provided on the outer circumferential surface of the outermost perforated steel plate 26a, as shown in FIG. 11, or may be provided on the inner circumferential surface of the innermost perforated steel plate 25a, as shown in FIG. 12.

The mesh net 27 may comprise a lattice steel net obtained by shaping wire into the form of a lattice, a wire lath obtained by weaving wire in the pattern of a diamond, or a metal lath obtained by forming slits on a thin steel plate having a thickness of 0.5 to 0.8 mm at regular intervals and pulling it sideways, thus causing the slits to form a diamond pattern.

Preferably, the mesh net 27 is 50 to 200 mesh so as to appropriately discharge gas. In a detailed description, when the mesh net is less than 50 mesh, the passage of gas is too fast, so that there is no effect of delaying the gas flow. Conversely, when the mesh net is more than 200 mesh, the passage of gas is too slow, so that the expansion of the air bag cushion is delayed. Thereby, the function of the inflater cannot be efficiently performed.

The inflater inside cylinder constructed as described above has the following effect. That is, a gas generating material 41 contained in the inside cylinder 20 is ignited and burnt, thus generating gas. The gas has high pressure and a high temperature of 2000° C. or higher. Thus, when the gas is discharged from the inside cylinder 20 to the outside cylinder 30, the first and second embossed steel plates 21 and 22 and the mesh net 27 more efficiently absorb the heat of the gas, and delay a sudden increase in pressure. Thereby, safety is ensured and the performance of the inflater is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, the present invention provides a structure of an inflater inside cylinder for an air bag for a vehicle, which can be easily applied to an inside cylinder of an inflater containing a gas generating material and provided in an air bag, which is one of the safety devices of the vehicle.

The invention claimed is:

1. A structure of an inflater inside cylinder for an air bag for a vehicle, the inflater including an outside cylinder and an inside cylinder, each having in a circumferential surface thereof a plurality of holes, wherein the inside cylinder comprises at least two cylindrical embossed steel plates, the plurality of holes being formed in embossed parts of the cylindrical embossed steel plates, which protrude outward or inwards from circumferential surfaces of the embossed steel plates so as to extend a gas discharge course.

2. The structure of the inflater inside cylinder according to claim 1, wherein the embossed holes are formed in one surface of each of the cylindrical embossed steel plates such that the embossed holes protruding from one of the cylindrical embossed steel plates face and alternate with the embossed holes protruding from the other cylindrical embossed steel plate.

3. The structure of the inflater inside cylinder according to claim 1, wherein a mesh net is provided between the at east two cylindrical embossed steel plates.

4. The structure of the inflater inside cylinder according to claim 3, wherein the mesh net comprises a metal mesh net, including a lattice wire net, a metal lath, or a wire lath, or comprises a non-metal mesh net made of heat-resistant ceramic fiber.

5. The structure of the inflater inside cylinder according to claim 1, wherein a mesh net is provided on an outer surface of an outermost cylindrical embossed steel plate.

6. The structure of the inflater inside cylinder according to claim 5, wherein the mesh net comprises a metal mesh net, including a lattice wire net, a metal lath, or a wire lath, or comprises a non-metal mesh net made of heat-resistant ceramic fiber.

7. The structure of the inflater inside cylinder according to claim 1, wherein a mesh net is provided on an inner surface of an innermost cylindrical embossed steel plate.

8. The structure of the inflater inside cylinder according to claim 7, wherein the mesh net comprises a metal mesh net, including a lattice, wire net, a metal path, or a wire lath, or comprises a non-metal mesh net made of heat-resistant ceramic fiber.

* * * * *